United States Patent

[11] 3,552,726

[72] Inventor Elroy J. Kraft
 Park Ridge, Ill.
[21] Appl. No. 783,030
[22] Filed Dec. 11, 1968
[45] Patented Jan. 5, 1971
[73] Assignee Eaton Yale & Towne Inc.
 a corporation of Ohio

[54] MOTORLESS CARBONATOR AND METHOD OF OPERATION
 4 Claims, 2 Drawing Figs.
[52] U.S. Cl............................................. 261/50,
 222/129, 261/51, 261/52, 261/121, 261/140
[51] Int. Cl............................................. B01f 3/04
[50] Field of Search...................................... 261/Car-
 bonators; 222/129.1; 261/35, 59, 52, 50, 51, 121,
 140

[56] References Cited
 UNITED STATES PATENTS
 2,612,304 9/1952 Nissen............................ (261/Carb.)

3,240,395 3/1966 Carver............................ (261/Carb.)
3,337,197 8/1967 Iannelli........................... (261/Carb.)
3,403,523 10/1968 Bauer et al...................... (261/Carb.)
3,472,425 10/1969 Booth et al. ................... (261/Carb.)

Primary Examiner—Tim R. Miles
Attorney—Hill, Sherman, Meroni, Gross and Simpson

ABSTRACT: A motorless carbonator with a mixing chamber having associated therewith a water supply system, a gas supply system, a vent system, a liquid level sensing device, and a dispensing device. The sensing device is adapted to sense a minimum and a maximum desired fluid level in the chamber and to actuate valves controlling the water supply, gas supply and vent in accordance therewith. The water supply valve has a time delay device to allow venting of the chamber prior to water inflow and the dispensing device is adapted to override actuation of the valves by the sensing device while the dispensing device is in operation.

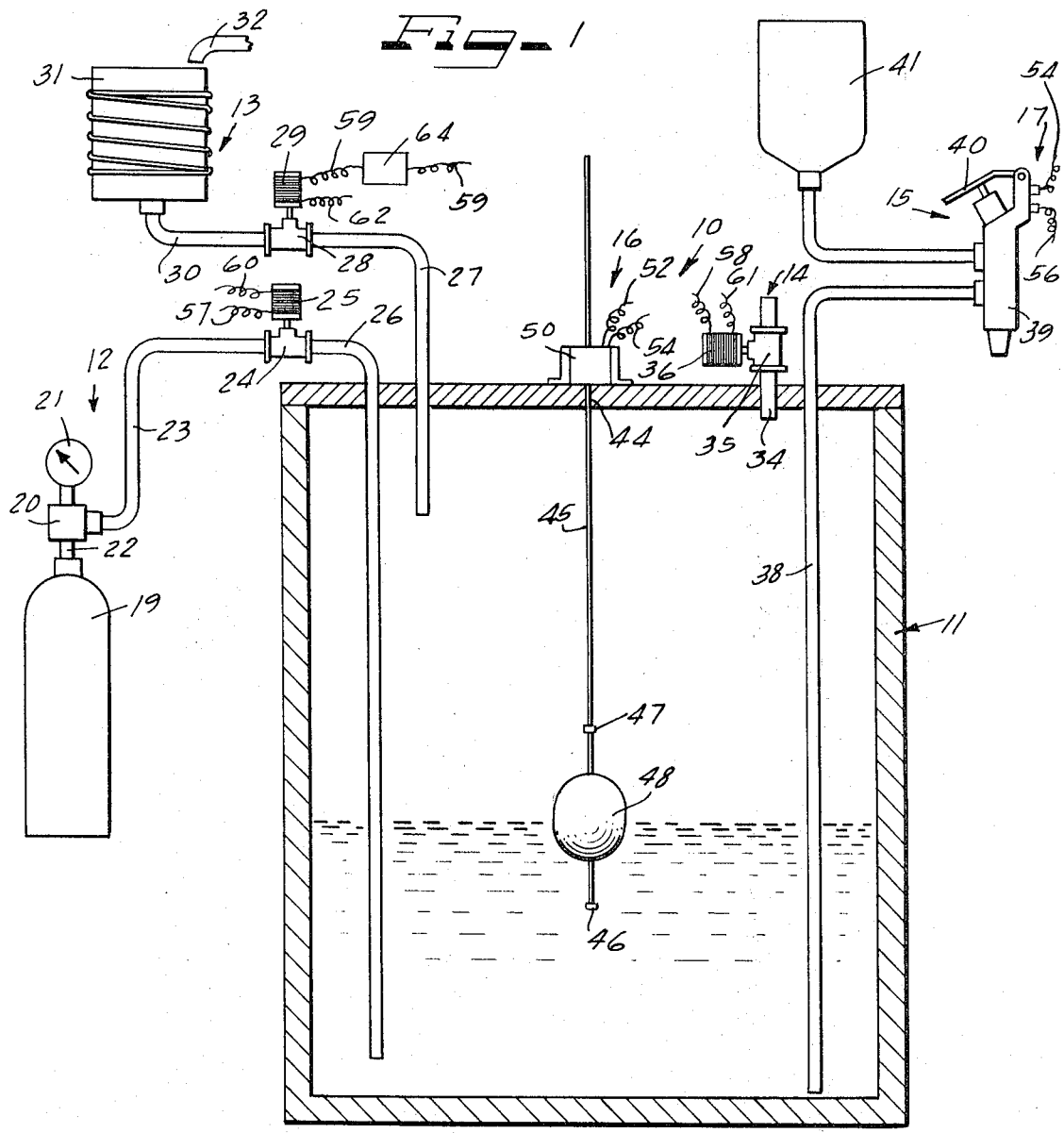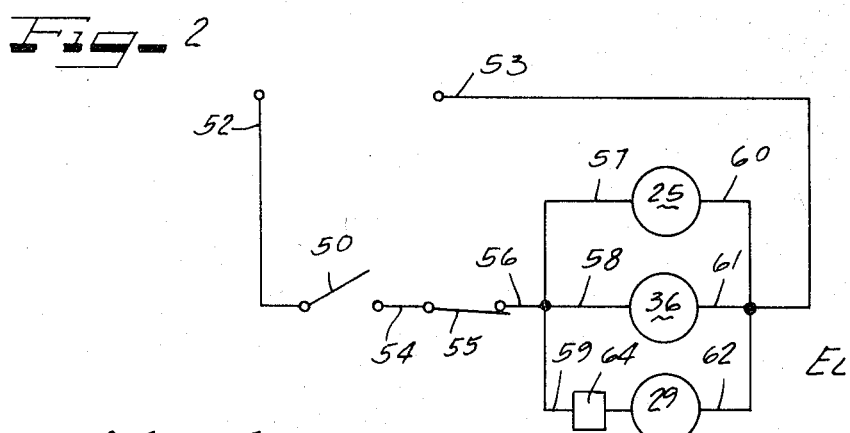

MOTORLESS CARBONATOR AND METHOD OF OPERATION

BACKGROUND OF THE INVENTION

1. Field of the Invention

This invention relates to methods, systems and apparatus for the carbonation of fluids and more particularly for carbonating water with $CO_2$.

2. Prior Art

Devices for carbonating fluids such as water with a gas such as $CO_2$ require a mixing vessel capable of retaining a pressure. Supply systems must be provided to supply both the water and the gas to the chamber and a dispensing system must be provided for withdrawing the carbonated water from the mixing vessel.

The prior art carbonators have retained pressure in the vessel at all times and have therefore required auxiliary pump motors or other mechanisms to force water into the pressurized chamber. The necessity of having complex valving and pumping apparatus for supplying water to the vessel has greatly increased the cost and manufacturing complexity of the devices.

Further, in some prior art devices, it was possible to open the dispensing valve while the water supply valve was open thereby allowing dispensing of unmixed gas and water and/or pure water through the dispensing system. Additionally, in those devices which vented the chamber, the water supply vent could be opened prior to complete venting of the chamber, thereby allowing a back pressure existent in the chamber to force gas into the fluid supply system.

These and other disadvantages inherent in the prior art are overcome by the present invention, which provides a carbonator with valving control systems effective to allow complete venting of the chamber prior to water supply thereto, and a control system override adapted to prevent water supply to the chamber during dispensing. Additionally, there is provided a level sensing float mechanism which allows dispensing of a desired amount of carbonated fluid without actuating recycling of the system.

The system includes a mixing chamber capable of being pressurized, a gas supply system for supplying carbonizing gas to the mixing chamber through an electrically controlled valve; a water supply system for supplying water to the mixing chamber through an electrically controlled valve and a vent system for venting the chamber of pressure through an electrically controlled valve. Additionally, there is provided a float mechanism capable of sensing the liquid level within the chamber which has a switching system associated therewith for actuating the electrical controls for the three valves. The float and switch are adapted to sense both minimum desired and maximum desired fluid levels thereby allowing intermediate fluid levels to exist without affecting the switching mechanism. There is additionally provided a dispensing system including an electrical override which prevents actuation of the electrically controlled valves by the float associated switching mechanism while the dispensing system is in operation. In order to assure venting of the mixing chamber prior to water inflow, a time delay mechanism is associated with the water supply valve which prevents actuation of the water supply valve until after the vent valve has been opened a desired length of time.

It is therefore an object of this invention to provide improved methods and apparatus for the carbonation of fluids.

It is another object of this invention to provide a device for the carbonation of fluids which does not require a motor.

It is a further object of this invention to provide a simplified device for the carbonation of fluids in a pressure chamber having gas and fluid supply systems controlled by a valve and a vent structure for the chamber controlled by a valve, which valves are actuated by a switch mechanism responsive to the fluid level in the pressure chamber It is yet another and more specific object of this invention to provide a carbonator having valve controlled fluid and water supply systems thereto and a valve control vent therefor, the valves being operated by a switching mechanism in response to fluid level in the container, a dispensing structure for dispensing fluid from the container and an override system associated with the dispensing structure to prevent actuation of the valves during dispensing.

It is yet another object of this invention to provide a carbonator for fluids which has a mixing chamber having a vent to release pressure therefrom and a fluid supply source to supply fluid thereto, the supply source being actuated only after actuation of the vent.

Other and further objects of this invention will be apparent to those skilled in this art from the following detailed description of the annexed sheets of drawings which, by way of a preferred embodiment of the invention, illustrate one example of the invention.

BRIEF DESCRIPTION OF THE DRAWINGS

FIG. 1 is a schematic view in cross section illustrating the carbonator of this invention.

FIG. 2 is a schematic diagram of an electric circuit for the carbonator of this invention.

DESCRIPTION OF THE PREFERRED EMBODIMENT

The carbonator 10 of this invention consists basically of a mixing chamber 11 which is illustrated as being rectangular but which may be of other configurations, a gas supply system 12, a fluid supply system 13, a vent system 14, a dispensing system 15, a first control system 16 and a second control system 17.

The chamber 11 functions as a storage and mixing receptacle and is airtight so as to be able to retain a pressure therein.

Water from the fluid supply system 13 is mixed with carbon dioxide from the gas supply system 12 in the chamber 11 to produce a carbonated water such as is provided with carbonated beverages. The system is adapted to be used in connection with a dispensing device for such carbonated beverages, although it also may be used as a recarbonator for previously carbonated fluids or in other embodiments. In those instances in which the system is to be utilized in connection with dispensing apparatus for carbonated fluids, it is desirable that a sufficient quantity of carbonated water be present in the chamber 11 to supply a plurality of carbonated beverage drinks. After dispensing some of the carbonated water from the container, the container should then refill automatically. In addition, the system preferably has a mechanism for preventing recycling when only a small amount of carbonated water has been dispensed from the chamber 11.

In order to avoid the necessity of water pumps or the like devices, this invention provides for the release of pressure within the chamber 11 prior to refilling, so that the water may be supplied through the fluid supply system 13 at a low line pressure. Additional apparatus is provided to insure that the chamber is depressurized prior to fluid supply in order to prevent carbonating gas from backing up into the fluid supply system. Additionally, since it is desirable to use the pressure in the chamber 11 to aid in the dispensing of fluid from the chamber, apparatus is provided to prevent recycling of the system during dispensing.

The gas supply system 12 includes a container 19 providing a source of pressurized carbonating gas such as $CO_2$, and a pressure regulator 20 having a gauge 21 and a conduit 22 connecting the container with the pressure regulator 20. A further conduit 23 communicates the pressure regulator with a valve 24 which is electrically controlled as by a solenoid 25. A conduit 26 extends from the valve 24 into the chamber 11, preferably terminating near the bottom thereof. When the valve 24 is open, the gas will flow from the container 19 to the inside of the chamber 11 until the chamber has been pressurized to a pressure equal to that which the pressure regulator is set to maintain. This will then result in an equalization of pressure and the supply of gas to the chamber will cease.

Because the pressure in the gas supply system 12 is always equal to or greater than the pressure in the container 11, there will be no backflow of gas or fluid from the chamber to the gas supply system.

The water supply system 13 includes a conduit 27 communicating to the interior of the mixing chamber 11, which is connected to a valve 28 electronically controlled as by solenoid 29. Water is supplied to the valve 28 by a conduit 30. The conduit 30 may be connected directly to a water line or may be connected to a precooling device 31, which is in turn connected through a conduit 32 to a water line (not shown).

The vent system 14 includes a conduit 34 communicating the interior of the mixing chamber 11 with a valve 35 which is electronically controlled as by a solenoid 36. Opening the valve 35 allows the mixing chamber 11 to be depressurized. With the valve 35 closed, the chamber 11 is airtight and may be pressurized by the gas supply system 12.

The dispensing system 15 includes a conduit 38 which communicates the interior of the mixing chamber 11 with a dispensing valve 39 which may be hand operated as by a handle 40. The dispensing valve 39 may be of the type adapted to mix soda from the chamber 11 with syrup from a syrup supply 41 to provide a carbonated flavored beverage.

The electrically controlled valves 24, 28 and 35 are actuated in dependent response to the fluid level in the mixing chamber 11 by the first control system 16 which is adapted to open and close an electrical path to energize and deenergize the valve controls 25, 29 and 36. The control system 16 may be of any type capable of sensing the fluid level in the chamber 11 and activating the valves in response thereto, the simplest type only being illustrated. FIG. 1 shows the control system 16 as comprising a rod 45 which extends into the chamber 11 from the top valve through an aperture 44 in the top of the chamber in which it is slidingly received. The rod 45 has a stop 46 at the bottom thereof, and a second stop 47 spaced from the stop 46. Between the stops 46 and 47 a buoyant float 48 is received around the rod 45. A switch mechanism 50 is operatively connected to the rod 45 and is actuated by vertical movement of the rod. The switch 50 may, for example, consist of a toggle switch with its projecting lever connected to the rod 45 in such a manner that vertical movement of the rod 45 will move the projecting lever to throw the switch. It can be seen that with the chamber 11 empty of fluid, the float 48 will rest against the stop 46 thereby weighting down the rod 45, causing it to move vertically downwardly until the switch 50 has been actuated. A stop (not shown) may be connected with the rod 45 exterior of the mixing chamber 11 to prevent further downward movement of the rod. Thereafter, as the mixing chamber 11 is filled with water, the float 48 will move vertically up the rod 45 until it contacts the stop 47. Thereafter, further vertical movement of the float 48 will cause the rod 45 to move upwardly. The upward movement of the rod 45 will again actuate the switch 50.

Because the space between the two stops 46 and 47 is greater than the height of the buoyant float 48, the float may be positioned in the area between the stops without actuating the switch 50. This allows the first control system 16 to sense both a maximum and a minimum fluid level in the chamber 11. The minimum level is sensed by contact between the float and the stop 46 sufficient to actuate the switch 50 while the maximum level is sensed by contact between the float 48 and the stop 47 sufficient to actuate the switch 50.

The second control system 17 includes a switch (not shown) operatively connected to the dispensing valve 39 so as to be actuated by movement of the handle 40 thereby opening or closing the switch contacts.

FIG. 2 is a schematic diagram of an electric circuit for connecting the valve actuators 25, 29 and 35 and the control systems 16 and 17. Electric wires 52 and 53 are connected to a current source (not shown). The wire 52 is connected to the switch 50 of the first control system which is adapted to operatively connect the wire 52 with the wire 54 which is in turn connected to the switch 55 associated with the dispensing valve 39 and which comprises the control system 17. The switch 55 is adapted to operatively connect the wire 54 to a wire 56. The wire 56 is in turn connected to wires 57, 58 and 59 which are operatively connected to the valve actuators 25, 36 and 29. The valve actuators 25, 36 and 29 are in turn connected to wires 60, 61, and 62 which are connected to the wire 53. Therefore, the switches 50 and 55 are connected in series and the valve actuators 25, 36 and 29 are connected in parallel.

The valves 24, 28 and 35 are biased to have a deenergized and an energized state which is either open or closed. In the preferred embodiment, the valve 24 is open in its deenergized state and the valves 28 and 35 are closed in the deenergized state. In this embodiment, the switch 55 associated with the dispensing valve 39 is normally closed and is adapted to be opened during actuation of the dispensing valve. It can therefore be seen that in the absence of actuation of the dispensing valve 39, the electrically controlled valves will be actuated by the first control system 16. The switch 50 is connected to the rod 45 in such a manner that when the weight of the float 48 rests against the stop 46 moving the rod 45 vertically downward, the switch will be closed. Upward movement of the rod 45 will open the switch 50 to break the circuit.

When the mixing chamber 11 is empty, the weight of the float 48 resting against the stop 46 will cause the switch 50 to close, thereby completing the electrical circuit. Energization of the valve actuator 25 will act to close the valve 24 shutting off gas supply to the chamber 11. At the same time, energization of the valve actuator 36 will open the valve 35 thereby venting the chamber 11 to allow escape of a positive pressure contained therein. Energization of the valve actuator 29 will open the valve 28 to supply water to the interior of the mixing chamber 11. In order to prevent a backflow of gas from the mixing chamber 11 through the conduit 27 into the water supply system 13, it is desirable that the valve 28 remain closed until after the mixing chamber 11 has been purged of pressure. For this reason, a time delay device 64 is connected to the wire 59 and acts to delay energization of the valve actuator 29 for a desired period of time such as four seconds from the time the circuit has been completed. This will assure that the vent system 14 is open prior to the water supply system to purge the mixing chamber 11 of pressure prior to inflow of water.

After the water supply system 13 has been opened, the fluid level in the container 11 will rise until the buoyant float 48 has contacted the stop 47 and moved the rod 45 vertically upwardly a distance sufficient to open the switch 50. Opening of the switch 50 will break the electrical circuit, deenergizing the valve actuators 25, 36 and 29. Deenergization of the valve actuators will allow the valves 25, 35 and 28 to return to their biased positions with the valve 24 open and the valves 28 and 35 closed.

Opening of the valve 24 will supply pressurized gas to the mixing chamber 11, allowing the water therein to be carbonated. Part of the gas entering the mixing chamber 11 through the conduit 26 will be dissolved in the water resulting in its carbonization. The remaining gas will rise to the top of the chamber 11, creating a pressure head to pressurized the chamber. The presence of a positive pressure in the chamber aids in the carbonization of the water therein.

When the pressure in the chamber 11 is equal to the pressure sure in the conduits 23 and 26 as determined by the setting of the pressure regulator valve 20, the flow of gas to the mixing chamber 11 will cease. Thereafter, actuation of the handle 40 to open the dispensing valve 39 will allow withdrawal of soda from the mixing chamber 11. The presence of a positive pressure in the mixing chamber 11 will force the soda to exit the chamber through the conduit 38 when the valve 39 is open. As soda is withdrawn through the conduit 38, the pressure in the mixing chamber 11 will be reduced. Reduction of the pressure in the chamber will unbalance the pressure level between the interior of the chamber and the gas supply system downstream of the pressure regulator valve 20, thereby allowing gas to again flow into the interior of the chamber 11. This will result in a continuous positive pressure in the mixing chamber 11 sufficient to aid in withdrawal of soda therefrom.

As the fluid level drops in the chamber 11 due to the withdrawal of soda therefrom; the buoyant float 48 will drop along the rod 45. If withdrawal of soda is stopped prior to the time the float 48 contacts the stop 46, no further action will take place. However, if more soda is withdrawn and the float 48 contacts the stop 46, thereby actuating the switch 50, the electrical circuit would again be completed. Because it is desirable to continue a pressure in the chamber 11 during dispensing, it is therefore necessary to prevent opening of the vent system 14 and closing of the gas supply system 12 during dispensing. Additionally, it is desirable to prevent a water supply to the chamber 11 during dispensing so as not to dilute the soda being dispensed. Therefore, the second control system 17 is associated with the dispensing valve 39 and is effective to override the first control system 16 to prevent energization of the valve actuators 25, 36 and 29 during dispensing. This is accomplished by the presence of the switch 55 which is opened by the actuation of the dispensing valve 39 to prevent completion of the electrical circuit. After dispensing has been completed and the dispensing valve 39 is closed, the switch 55 will also be closed thereby allowing recycling of the carbonator if the fluid level therein had dropped sufficiently to actuate the switch 50.

It is to be understood that although the valve 24 has been described as being open and the valves 28 and 35 closed when their respective valve actuators are deenergized, the system can be reversed such that the valves 28 and 35 are normally open and the valve 24 normally closed. In such an embodiment, the switch 50 would be opened by the action of the float 48 against the stop 46 and closed by action of the float against the stop 47. Further, the switch 55 of the second control system 17 would then be wired in parallel with the switch 50. In that case, the time delay device 64 would be of a type which would prevent deenergization of the valve actuator 29 until a certain period of time after breaking of the electrical circuit.

Although I have herein set forth my invention with respect to certain specific principles and details thereof, it will be understood that these may be varied without departing from the spirit and scope of the invention as set forth in the hereunto appended claims.

I claim:

1. A device for carbonating liquids comprising:
a pressurizable mixing chamber;
a gas supply system;
a fluid supply system;
a vent system;
a dispensing system;
said systems communicating to the interior of said mixing chamber;
first valve means associated with the said gas supply system effective to control flow of gas to the said chamber;
second valve means associated with the fluid supply system adapted to control flow of fluid to the chamber;
third valve means associated with the vent system adapted to control venting of the said chamber;
a control system;
said control system adapted to sense maximum and minimum desired fluid levels in the said mixing chamber;
said control system adapted to operate the said first, second and third valve means in dependent response to fluid level in the said chamber; and
means for delaying actuation of the said second valve means until after actuation of the third valve means.

2. The device of claim 1 wherein the said dispensing system includes a second control system effective to override the first control system to prevent actuation of the said first, second, and third valve means during actuation of the dispensing system.

3. The method of carbonating a fluid in a pressurizable container comprising the steps of:
supplying a fluid to the chamber with the chamber at a first pressure;
sensing the fluid level in the chamber;
simultaneously terminating supply of fluid to the chamber;
sealing the chamber, and initiating supply of pressurized gas to the chamber in dependent response to the fluid level in the chamber;
continuing to supply pressurized gas to the chamber until a second pressure level is obtained in the chamber;
thereafter ceasing supply of gas to the chamber;
dissolving some of said supplied gas in the fluid in the chamber to create a soda;
withdrawing some of said soda from the chamber;
selectively supplying further pressurized gas to the said chamber to retain the said chamber at the said second pressure level;
sensing fluid level in the said chamber during and after withdrawal of said soda;
simultaneously terminating supply of gas to the said chamber and unsealing the said chamber to return the said chamber to the said first pressure level in dependent response to the fluid level in the said chamber; and
thereafter supplying fluid to the said chamber at the said first pressure level.

4. In a device for carbonating fluids in a pressurizable chamber having gas and fluid supply systems associated therewith and positive action means for controlling flow from the supply systems to the chamber, the flow being from only one of the supply systems at a time, the improvement of actuatable means for venting the chamber while the flow from the gas supply system is stopped and means for delaying flow of fluid to the chamber until after the means for venting has been actuated to vent the chamber.